(12) United States Patent
Fries (10) Patent No.: US 11,948,463 B2
(45) Date of Patent: Apr. 2, 2024

(54) TELEMATICS CONTROL ENTITY PROVIDING POSITIONING DATA WITH INTEGRITY LEVEL

(71) Applicant: Harman Becker Automotive Systems GmbH, Karlsbad (DE)

(72) Inventor: Dirk Fries, Straubenhardt (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 554 days.

(21) Appl. No.: 17/166,509

(22) Filed: Feb. 3, 2021

(65) Prior Publication Data

US 2021/0248910 A1 Aug. 12, 2021

(30) Foreign Application Priority Data

Feb. 7, 2020 (EP) .................................... 20156079

(51) Int. Cl.
| | |
|---|---|
| *G08G 1/00* | (2006.01) |
| *G01S 19/08* | (2010.01) |
| *G01S 19/20* | (2010.01) |
| *G07C 5/00* | (2006.01) |
| *G08G 1/123* | (2006.01) |
| *H04W 4/46* | (2018.01) |
| *H04W 84/02* | (2009.01) |

(52) U.S. Cl.
CPC ............... *G08G 1/20* (2013.01); *G01S 19/08* (2013.01); *G01S 19/20* (2013.01); *G07C 5/008* (2013.01); *G08G 1/123* (2013.01); *H04W 4/46* (2018.02); *H04W 84/02* (2013.01)

(58) Field of Classification Search
CPC .......... G01S 19/14; G01S 19/20; G01S 19/35; G01S 19/40; G01S 19/48; G01S 19/17; G01S 19/38; G01S 19/39; G01S 19/08; B60W 2420/52; B60W 2710/18; B60W 2710/20; B60W 2556/50; B60W 30/18; G08G 1/20; G08G 1/123; G07C 5/008; H04W 4/46; H04W 84/02
See application file for complete search history.

(56) References Cited

U.S. PATENT DOCUMENTS 9,672,719 B1 * 6/2017 Hollenstain ............ G08B 21/18
10,580,286 B1 * 3/2020 Kaminski ............... H04W 4/40
(Continued)

FOREIGN PATENT DOCUMENTS

DE 102017219070 A1 4/2019

*Primary Examiner* — Olumide Ajibade Akonai
(74) *Attorney, Agent, or Firm* — Angela M. Brunetti (57) ABSTRACT

A telematics control entity to determine position data of a vehicle having a network access entity connected to a cellular network and configured to transmit, in case of an emergency, a vehicle position via the cellular network to a service entity configured to collect the vehicle positions for a plurality of vehicles. An antenna signal interface is configured to receive satellite-based measurement data and at least one position determining unit is configured to determine positioning data of the vehicle based on the satellite-based measurement data. A predefined integrity level describing a predefined risk classification of the functional safety is guaranteed to be provided by the positioning data. The positioning data is provided to an application entity in the vehicle requiring the predefined integrity level for the received positioning data.

15 Claims, 4 Drawing Sheets

(56) References Cited

U.S. PATENT DOCUMENTS

| | | | |
|---|---|---|---|
| 11,017,476 B1* | 5/2021 | Gainer | G07C 5/0808 |
| 11,636,718 B2* | 4/2023 | Staehlin | G07C 5/085 |
| | | | 701/32.2 |
| 2015/0054680 A1 | 2/2015 | Lennen | |
| 2018/0259651 A1 | 9/2018 | Antoni et al. | |
| 2019/0056510 A1* | 2/2019 | de Groot | G01S 19/20 |
| 2021/0116579 A1* | 4/2021 | Rezaei | G01S 19/25 |

* cited by examiner

TELEMATICS CONTROL ENTITY PROVIDING POSITIONING DATA WITH INTEGRITY LEVEL

CROSS REFERENCE

Priority is claimed to application Ser. No. 20156079.4, filed Feb. 7, 2020 in Europe, the disclosure of which is incorporated in its entirety by reference.

TECHNICAL FIELD

The present application relates to a telematics control entity configured to determine position data of a vehicle. Furthermore, a method for operating the telematics control entity is provided and a computer program comprising program code.

BACKGROUND

Nowadays, most of the vehicles are equipped with navigation systems which can track the position of the vehicle and which can provide driving recommendations and guide the vehicle to a desired destination. To this end, the vehicles are equipped with receivers which are capable of receiving information from GNSS (Global Navigation Satellite Systems) satellites, and the received satellite-based measurement data can be used to determine a position of the receiver.

In this context, telematic control units, TCUs, are known which track the vehicle position and provide the vehicle position via an external interface and a cellular network to a centralized server, by way of example in case of an emergency so that the vehicle position is exactly known. When a hazardous situation is detected within the vehicle or when the driver actuates a certain button, the position is automatically transmitted to the centralized server. This can facilitate and improve first aid measures.

Recently, there is an increased focus on autonomous vehicles which can move without the aid of a driver. In order to let a vehicle run autonomously, it has to sense the environment and surrounding and process the data in order to take the decisions how to react in certain situations. To this end, a plurality of sensors, such as cameras, LIDAR etc., are used. For autonomous driving sensor fusion is necessary in order to collect information from different sensor types. In autonomous driving, risk management and the assessing of safety hazards play an important role. However, the components provided in a vehicle do not always fulfill certain safety requirements.

Accordingly, a need exists to improve the safety in a vehicle and to be able to use existing components in a vehicle for situations where a risk classification has to be carried out in order to check whether sensor data can be used for safety relevant purposes within a vehicle.

SUMMARY

This need is met by the features of the independent claims. Further aspects are described in the dependent claims.

According to one aspect, a telematics control entity is provided to determine position data of a vehicle. The telematics control entity comprises a network access entity configured to be connected to a cellular network and configured to transmit, in case of an emergency, a vehicle position via the cellular network to a service entity configured to collect vehicle positions for a plurality of vehicles. Furthermore, the telematics control entity comprises an antenna signal interface configured to receive satellite-based measurement data. Furthermore, at least one position determining unit is provided to determine positioning data of the vehicle based on the satellite-based measurement data. The at least one position determining unit is configured to guarantee a predefined integrity level describing a predefined risk classification of the functional safety provided by the positioning data as determined by the at least one position determining unit. The at least one position determining unit is further configured to provide the determined positioning data to an application entity in the vehicle requiring the predefined integrity level for the received positioning data.

Accordingly, the telematics control entity which provides a vehicle position via the cellular network to a service entity is also able to provide position data meeting a certain predefined integrity level.

Preferably, the predefined integrity level is an integrity level defined by ISO 26262 s valid at the date of filing of the present application, e.g. ASIL B a.

Furthermore, the corresponding method is provided for operating the telematics control entity in which the telematics control entity receives the satellite-based measurement data and determines, by the at least one position determining unit, the positioning data and wherein the at least one position determining unit is guaranteeing the predefined integrity level describing the predefined risk classification of the functional safety provided by the positioning data as determined by the at least one position determining unit. Furthermore, the at least one position determining unit provides the determined positioning data to the application entity and the vehicle requiring the predefined integrity level for the received positioning data.

Furthermore, a computer program comprising program code to be executed by the telematics control entity is provided wherein an execution of the program code causes the telematics control entity to carry out a method as discussed above or as discussed in further detail below.

Other devices, systems, methods, features and advantages will become apparent to one with skill in the art upon examination of the following detailed description and figures. It is intended that all such additional systems, methods, features, and advantages be included within this description, be within the scope of the invention and be protected by the claims.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between functional components may be established over a wired or wireless connection. Functional blocks may be implemented in hardware, software, firmware, or a combination thereof.

Figure 1:
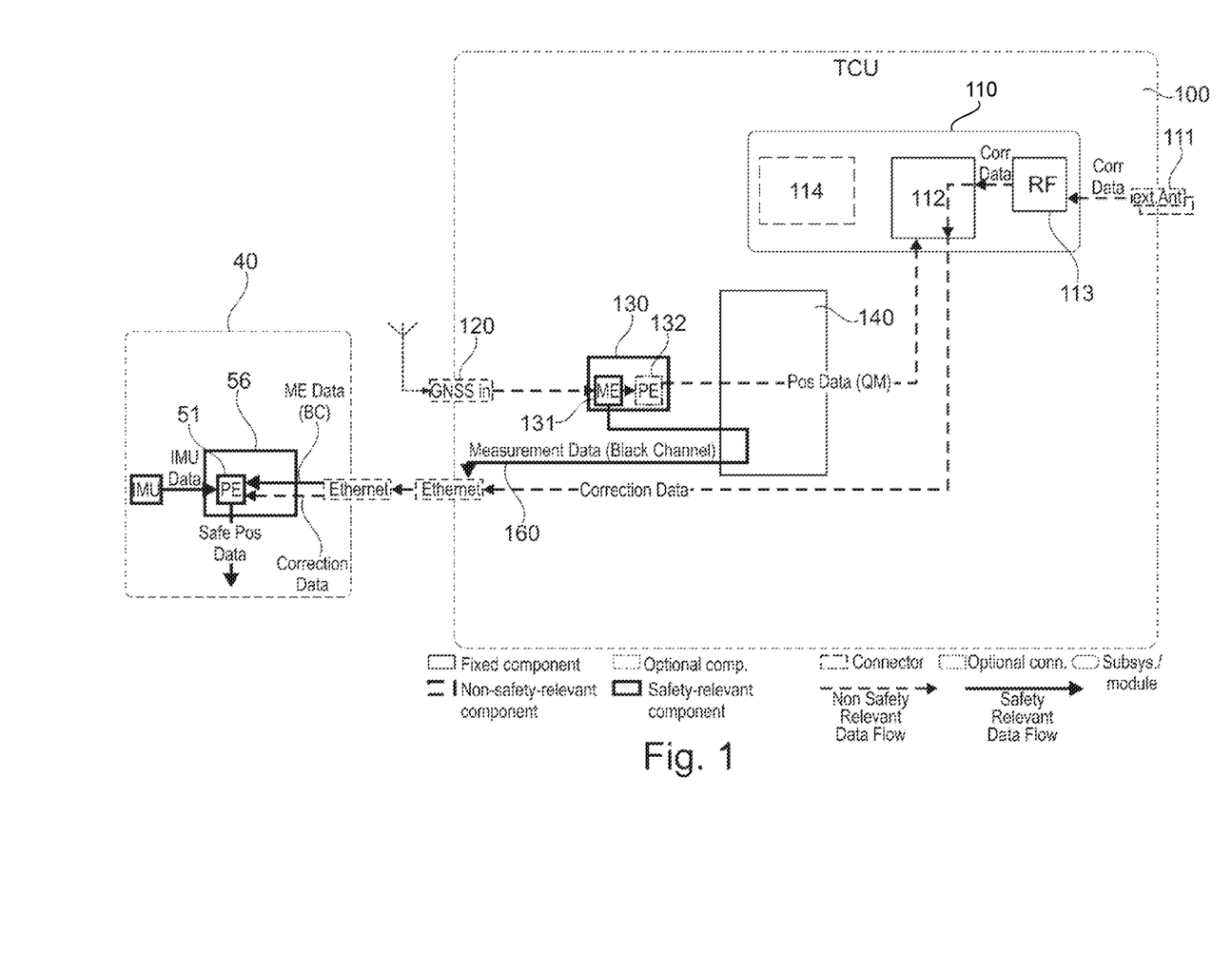
FIG. 1 shows a schematic architectural view of a telematics control entity configured to provide positioning data guaranteeing a predefined integrity level.

FIG. 1 shows a telematics control entity 100 which comprises a network access entity 110 which is connected to a cellular network using an interface 111. The network access entity 110 can be implemented as network access device, NAD. The network access entity is configured to automatically dial an emergency number in the event of an accident and is configured to communicate the vehicle's location to an emergency service. To this end, the network access entity can comprise a communication processor 112 and a RF unit, or Radio Frontend, 113 via which the communication to the cellular network is possible. Correction data, which is used to increase the accuracy of the calculated vehicle position may be provided via the cellular network (received by the NAD, or via satellites. By way of example, the correction data can include exact positions of known landmarks which are transmitted via the cellular network to the vehicle.

The telematics control entity 100 comprises an interface for receiving satellite signals 120 configured to receive the satellite-based measurement data. The received data are fed to a receiving and processing unit (GNSS receiver), also called position determining unit 130 hereinafter. The position determining unit 130 comprises a measurement entity 131 which receives the satellite-based measurement data and determines raw satellite position data. The measurement entity 131 decodes the received data and generates the raw satellite position data as received from the satellite (e.g. Cartesian coordinates). Furthermore, a positioning entity 132 is provided which based on the raw satellite position data determines a position of the vehicle (e.g. latitude, longitude and height). The positioning entity 132 determines a position of the vehicle which does not meet any integrity level.

Traditionally, automotive designers have based their safety strategy on the principal that the driver is ultimately responsible for the safety and is capable of identifying possible hazards. Autonomously driven vehicles should be able to operate without a human driver. Functional safety of the components involved is an important topic for the reduction of safety critical risk. To this end, standards exist which address computer-based system safety for vehicles. One possible standard is the ISO standard 26262 valid at the time of filing of the present application. The functional safety ensures that the system has the capability to mitigate the risk of failures for identified hazards. The amount of mitigation required depends upon the severity of the potential loss event, the operational exposure to hazards and the human driver controllability of the system when a failure occurs. These factors are combined into an automotive safety integrity level, ASIL, and the ISO standard knows for different levels, A, B, C and D. ASIL A represents the lowest degree and level D represents the highest degree of automotive hazard. By way of example, systems like airbags or brakes and power steering require the D grade whereas components such as the rear lights may only require the A grade in autonomous driving situations.

In the embodiment shown in FIG. 1, the measurement entity 131 is a component considered as safety relevant, whereas the positioning entity 132 is not considered as safety relevant. Accordingly, the positioning data, the actual position determined by the positioning entity 132 does not meet any of the integrity levels.

The measurement entity 131 provides the raw satellite position data to a module 40 provided outside the telematics control entity 100. The module 40 can be implemented as advanced driver assistance system which receives the different sensor data and controls the operation of the vehicle. To this end, the module 40 can comprise a processing unit 56 which can be implemented as microcontroller unit, MCU. The processing unit can comprise the positioning unit 51 which is able to determine the actual vehicle position according to a defined integrity level based on the received raw satellite position data. The module 40 may provide functions such as adaptive cruise control, lane departure warning, emergency brake assistance, blind spot detection etc. Accordingly, the module 40 needs a position which guarantees a predefined integrity level such as one of the levels A to D of the ASIL system.

In the wording of the ISO standard, the whole telematics control entity 100 may be considered as a quality management, QM, system. The blocks such as the receiving and processing unit or position determining unit 130 or processing unit 140 with the corresponding power supply components can be considered within the telematics control entity (system) as 25 Safety Element out of Context, SEooC. Processing unit 140 may also be considered as not safety relevant, however the power supply providing power to the position determining unit 130 can be considered as SEooC. The data exchange or communication channel 160 between the measurement entity 131 and the positioning entity 51 provided within the processing unit 56 can be realized as black channel communication. This means that the data exchange between the elements such as the SEooC and the other peer, the data consumer, is implemented as communication with an end-to-end protection. Each of the endpoints, here the measurement entity 131 and the positioning entity 51 is responsible to detect invalid, missing or delayed messages. Furthermore, the data path between the sending side and the receiving side is not processing, checking, monitoring, modifying or validating any of the transmitted data in this communication path. The communication path within the telematics control entity such as between the position determining unit 130 and the other components such as the network access entity 110 or the processing unit 140 is not safety relevant. In the embodiment shown in FIG. 1, and also in all the other embodiments discussed in connection with FIGS. 2 and 3, the safety relevant transmission channels are implemented as bold lines.

Summarizing, in the embodiment shown in FIG. 1, the measurement entity 131 and the positioning entity 51 are considered as safety relevant components. Accordingly, the position determining unit 130 and also the processing unit 56 are considered as being safety relevant components. However, the positioning entity 132 is not considered safety relevant and provides a vehicle position to any application within the telematics control entity 100 (e.g. to the network access entity 110) which does not meet any integrity level.

In the embodiment of FIG. 1, the network access entity 110 does not have to include its own position determining entity. However, the entity 110 may additionally comprise the position determining entity 114 which provides the position which is required for the emergency call service. In the embodiment shown, however, the positioning data, without the required integrity level, are provided by the positioning entity 132. The correction data received via the network for improving the position determination are also transmitted to the positioning entity 51 so that a more accurate position of the vehicle can be determined. This correction data itself is not safety-relevant, even if the entity by which it is processed (i.e. the positioning entity 51) is safety-relevant.

Figure 2:
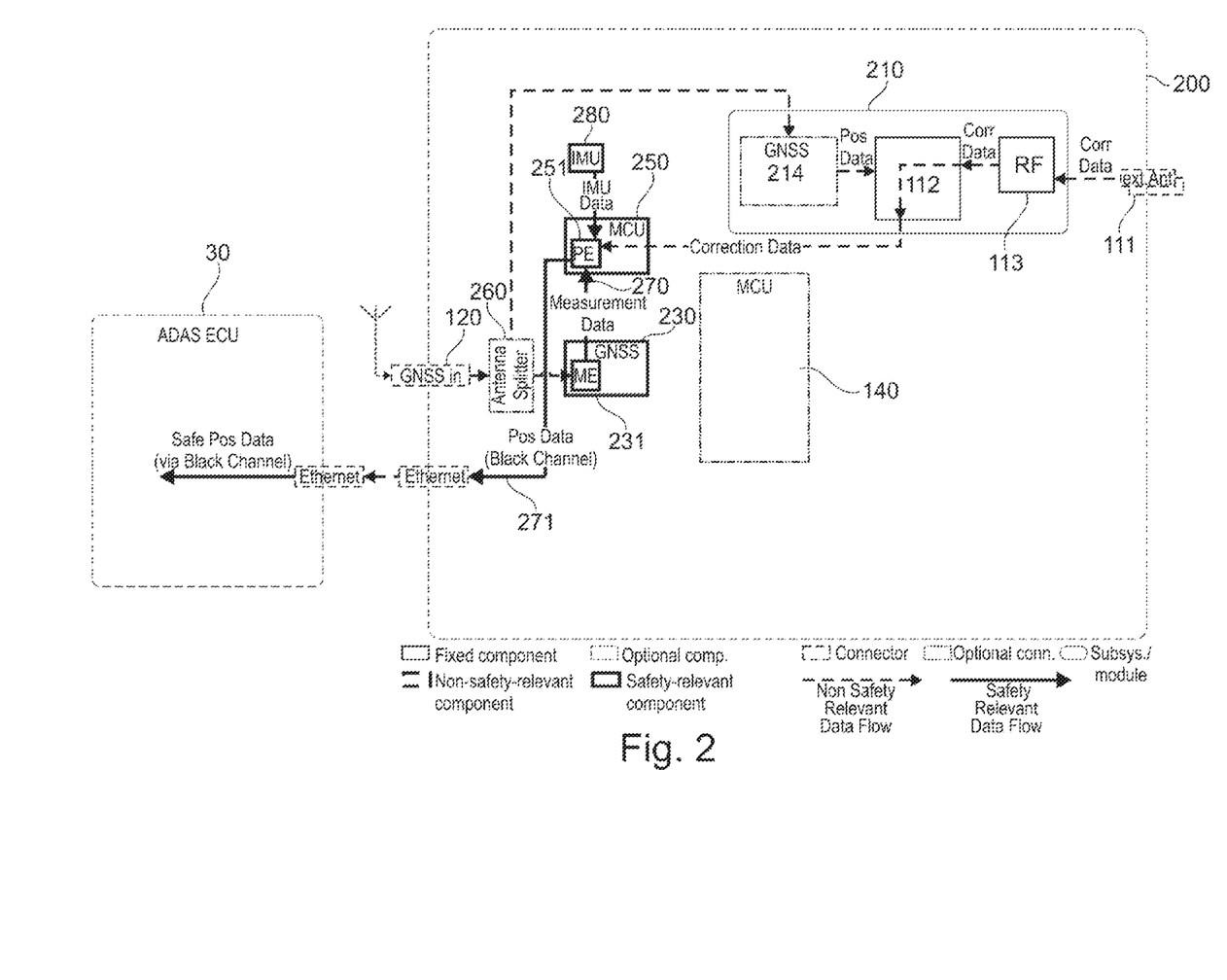
FIG. 2 shows another schematic architectural view of a telematics control entity configured to provide positioning data guaranteeing a predefined integrity level.

FIG. 2 shows another embodiment of the telematics control entity 200. In this figure, the entities having the same reference numerals as shown in FIG. 1 are implemented in the same way as in FIG. 1 and reference is made to the description of FIG. 1 for these modules or parts. As in the embodiment of FIG. 1, the telematics control entity 200 receives the satellite-based measurement data using the antenna signal interface 120. Furthermore, an antenna splitter 260 is provided which distributes the received data to a position determining unit 214 which is integrated in the network access entity 210 and to the position determining unit 230. The network access entity 210 comprises a position determining unit 214, a communication processor 112 and a RF unit 113 for the communication with the cellular network (not shown). The network access entity 210 determines a position of the vehicle based on the satellite-based measurement data and this vehicle position can be transmitted to the service entity collecting the positions in case of an emergency.

In the embodiment shown, the antenna signal is also transmitted to the position determining unit 230 which comprises a measurement entity 231 similar to the measurement entity 131 discussed above in connection with FIG. 1. The measurement entity 231 determines the raw satellite position data from the received satellite-based measurement data and transmits the measurement data to a positioning entity 251 provided in processing unit 250. The processing unit 250 also receives the correction data needed to calculate the accurate position of the vehicle. Accordingly, the positioning entity 251 determines the position of the vehicle based on the satellite data and eventually on the correction data. The positioning entity is configured such that it meets a predefined integrity level. The communication path 270, between the measurement entity and the positioning entity is safety-relevant and may also be implemented as black channel communication.

The determined position meeting the integrity level is then transmitted to the module 30 which is responsible for the sensor fusion and the controlling of the vehicle in case of an autonomous vehicle or for any other control or monitoring such as line departure warning, automatic cruise control etc.

The connection from the positioning entity to module 30, the communication path 271, is again implemented as black channel communication discussed above. The entities 230 and 250 can be considered as safety element out of context, SEooC, in the meaning of the ISO standard.

The embodiment shown in FIG. 2 has the advantage that the complete positioning solution is located within the telematics control entity. Furthermore, the positioning solution for the emergency call provided by the network access entity 210 is independent from the safety critical positioning feature provided by the measurement entity 231 and the positioning entity 251.

Furthermore an Inertial measurement unit, IMU, 280 may be provided which can help to determine the position of the vehicle. IMU 280 provides acceleration and rotation data of the vehicle which can be used when no satellite-based measurement signal is present. If this component is present, it may be implemented as SEooC, as the data by this component also should have a certain integrity level.

Figure 3:
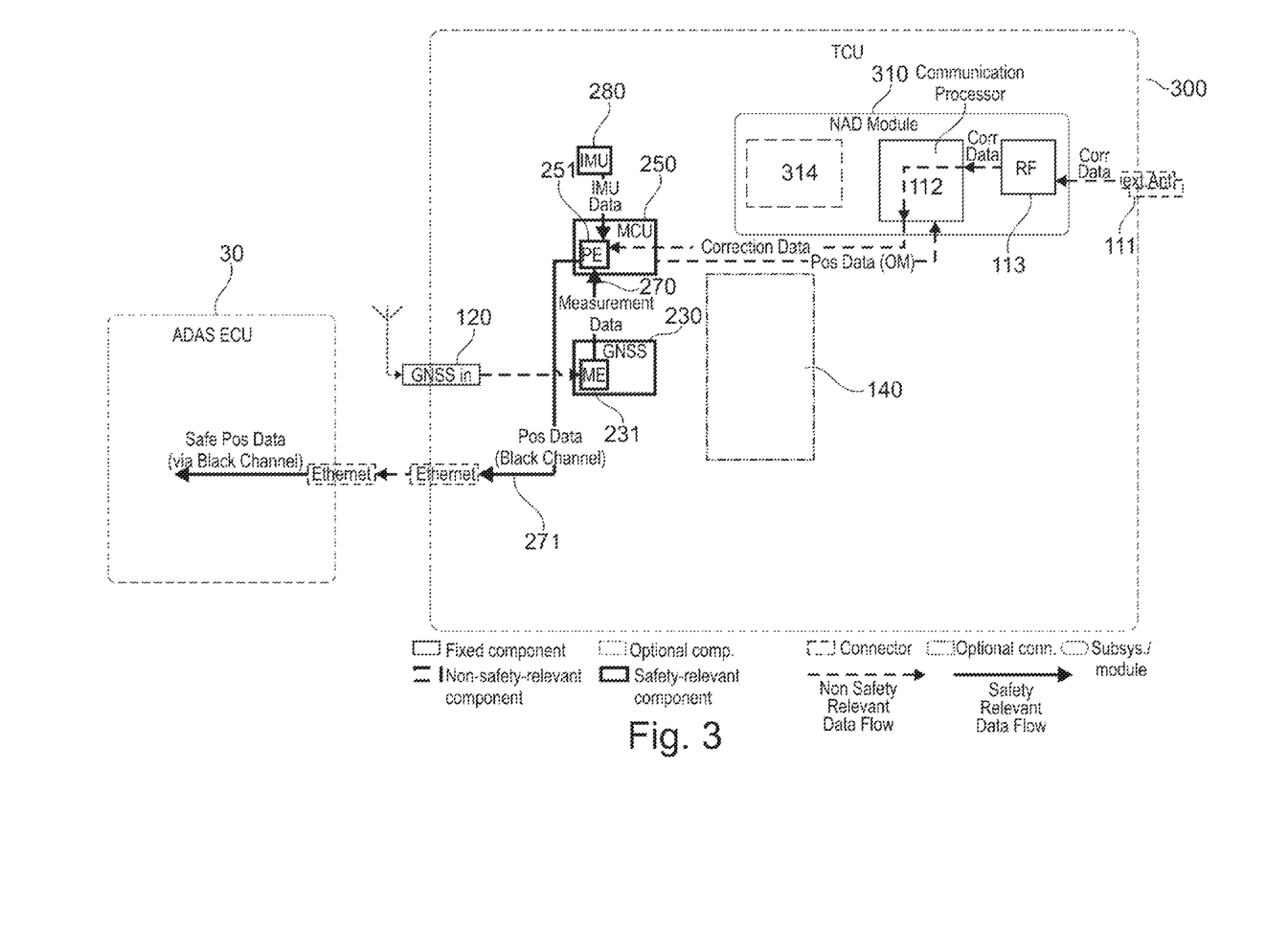
FIG. 3 shows a further schematic architectural view of a telematics control entity configured to provide positioning data guaranteeing a predefined integrity level.

FIG. 3 shows a further embodiment similar to the embodiment shown in FIG. 2. In this embodiment, the telematics control entity 300 also comprises the measurement entity 231 and the positioning entity 251 so that directly the vehicle position is transmitted over the black channel to module 30. However, in the embodiment of FIG. 3, the position determined by positioning unit 251 can also be used by any application within the telematics control entity 300 (e.g. by the network access entity 310). Accordingly in this example, the network access entity (310) uses the data provided by the positioning entity 251 and which in theory meet a required integrity level, however, the network access entity 310 ignores this integrity level and uses the received data as data not meeting any integrity level. Accordingly, it simply ignores this integrity level and uses the provided position which is provided to the communication processor 112 which can then provide the position information (via the radio frontend 113) to the cellular network resp. a service entity collecting the positions in case of an emergency.

Accordingly, an own positioning determining unit 314 shown in dashed line may be provided in the network access entity, but is not necessarily provided as the position information is received from the functional blocks providing the safety critical positioning.

Again the functional blocks for the safety critical positioning including modules 230 and 250 as well as the IMU 280 are considered as SEooC and a black channel communication is established between the positioning entity 251 and module 30.

Figure 4:
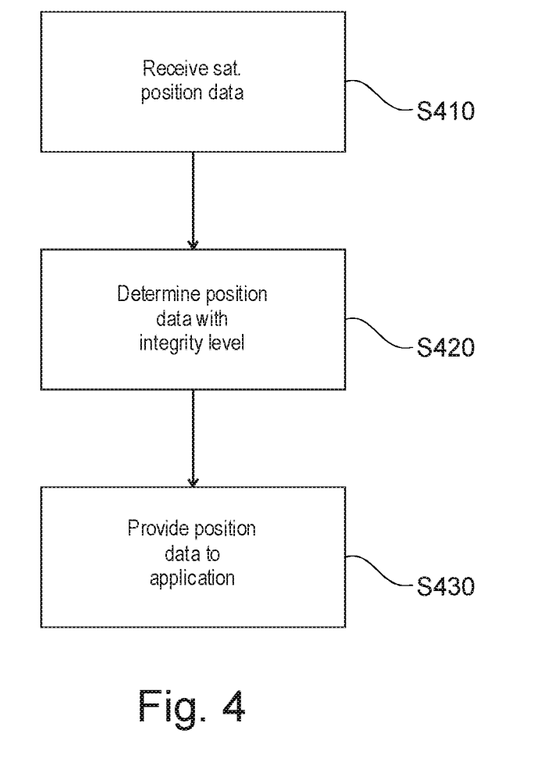
FIG. 4 shows an example schematic flowchart of a method carried out by one of the telematics control entities as shown in FIGS. 1 to 3.

FIG. 4 summarizes some of the steps carried out by the entities 100 to 300 shown in FIGS. 1 to 3. In step S 410, the telematics control entity receives the satellite-based measurement data.

In step S 420, it determines positioning data of the vehicle using the received satellite-based measurement data wherein the position determining unit determining the positioning data guarantees the predefined integrity level which is required by the corresponding module or application to which the positioning data are transmitted. In the embodiment of FIG. 1, the positioning data comprise the raw satellite position data as determined by the measurement entity 131, whereas in the embodiments of FIGS. 2 and 3 the determined positioning data already include the final position of the vehicle. In step S 430, the determined position which meets the required integrity level, is then provided to an application entity which uses the vehicle position for further processing, such as modules 30 or 40. These modules may use the provided position for an active control of the vehicle. The integrity level can be ASIL A, B, C, or D, preferably ASIL B. For other risk classification standards, other values may be possible.

From the above said some general conclusions can be drawn.

The predefined integrity level can be an ASIL defined by ISO 26262 as valid at the date of the filing of the present application. However, it should be understood that any other standard defining integrity levels could be used.

The position determining unit such as the measurement entity 131, 231 or the positioning entity 251 can be configured as Safety Element out of Context according to the ISO standard mentioned above.

The position determining unit such as unit 130 shown in FIG. 1 can comprise a first measurement entity 131 configured to guarantee the predefined integrity level and configured to determine the raw satellite position data from the received satellite-based measurement data. The measurement entity can furthermore be configured to transmit the raw satellite position data to a first positioning entity which then determines the first position of the vehicle meeting the integrity level.

In the embodiment of FIG. 1, the positioning entity 51 was located outside the telematics control entity, whereas in the embodiment of FIGS. 2 and 3 the positioning entity 251 was located within the telematics control entity.

As shown above, the telematics control entity 200, 300 can also comprise the first positioning entity such as entity 251 which receives the raw satellite position data from the first measurement entity 231 and is configured to determine a first position of the vehicle based on the raw satellite position data wherein this first position meets the predefined integrity level. Furthermore, a bidirectional communication channel can be established between the first measurement entity 231 and the first positioning entity 51, 251 and this communication channel is configured with an end-to-end protection between the two ends of the communication channel with no processing or modification of information transmitted in the bidirectional communication channel between the two ends of the communication channel. Furthermore, each end of the communication channel is configured to detect invalid, missing or delayed information transmitted between the two ends of the communication channel. The first positioning entity is configured to provide the determined first position as positioning data to the application entity in a further communication channel 271 between the first positioning entity such as entity 251 and the application entity provided in module 30. This further communication channel is again configured with an end-to-end protection between the two ends of the communication channel with no processing or modification of information transmitted in the bidirectional further communication channel between the two ends. Furthermore, each of the ends of the communication channel is configured to detect invalid, missing or delayed information transmitted between the two ends of the communication channel.

This embodiment was discussed above in connection with FIGS. 2 and 3 where the position itself is determined within the telematics control entity. The network access entity can furthermore comprise a second positioning entity configured to receive the satellite-based measurement data and which is configured to determine a second position of the vehicle wherein the second positioning entity does not meet any predefined integrity level describing the predefined risk classification of the functional safety provided by this entity. The network access entity is then configured to transmit the second position as vehicle position to the service entity.

This embodiment was discussed above in connection with FIG. 2 where the measurement and positioning entity are implemented in module 214.

Here, the telematics control entity can furthermore comprise a splitting unit configured to split the received satellite-based measurement data and configured to provide the satellite-based measurement data to the first measurement entity and to the second positioning entity.

As shown above in connection with FIG. 3 the first positioning entity can be configured to provide the first position meeting the predefined integrity level also to the network access entity 310 which then ignores this integrity level and transmits the first position as vehicle position to the service entity.

Furthermore, the first positioning entity may be configured to receive position adjustment data from the cellular network such as the correction data mentioned above wherein the first positioning entity such as entity 251 is configured to use the position adjustment data to determine the first position of the vehicle with a higher accuracy compared to the vehicle position determined by the network access entity.

As discussed above in connection with FIG. 1, a bidirectional communication channel may be provided between the first measurement entity and the first positioning entity provided outside the telematics control entity. Again this communication channel may be implemented as black channel with the end-to-end protection between the two ends of the communication channel with no processing or modification of information between the two ends of the communication channel. Furthermore, each end of the communication channel is configured to detect invalid, missing or delayed information transmitted between the two ends and the first measurement entity is configured to provide the raw satellite position data as measurement data to the first positioning entity located outside the telematics control entity.

The telematics control entity may then comprise a second positioning entity such as entity 132 shown in FIG. 1 configured to receive the raw satellite position data from the first measurement entity and which determines a second position of the vehicle. This second position determining entity does not meet any predefined integrity level describing the predefined risk classification of the functional safety provided by the second position as determined by the second positioning entity. The second positioning entity is configured to transmit the second position to the network access entity (or any other application within the TCU) and the network access entity is configured to transmit the second position as vehicle position to the service entity.

The receiver receiving the satellite-based signals can be an element which is not developed in the context of a particular vehicle or particular system.

The positioning determining units such as the measurement entities or positioning entities may be configured to detect when an error occurring in the received raw satellite position data is occurring without a need of an input from outside the corresponding positioning determining entity.

This means that any malfunction or problem within the devices detected by the device itself. Furthermore, the black channel communication which might be an ASIL B compliant communication between the two ends is not affecting any other component within the telematics control entity.

Preferably, the safe communication channel between the message sender and the message receiver is not affecting any other component within the telematics control entity and there is no monitoring or diagnosis of the safety relevant components by other components within the telematics control entity. All SEooC components can be considered as safety relevant.

Furthermore, the non-availability of the safety relevant functionality provided by the different SEooCs is detected by the communication peer, the data consumer without any signaling by another component of the telematics control entity. In case of any malfunction or out of range operation of the SEooC, it just stops sending messages which is then detected by the message receiver. In other words, no component outside the SEooC should be involved in determining that a malfunction occurs.

The power supply components supplying the safety relevant components with power may be potentially safety relevant. The satellite receiver itself is not part of the safety relevant positioning. Any required monitoring or diagnosis of the satellite receiver is done by the safety relevant component receiving the signal from the radio receiver.

The signal provided by the satellite receivers 120 are not safety relevant so that the antenna signal path is not part of the safety relevant components.

Summarizing, the present application provides a telematics control entity which can additionally provide position information meeting predefined integrity levels so that the provided position information can be used by applications which require a position meeting a certain integrity level.

The invention claimed is:

1. A telematics control entity configured to determine position data of a vehicle, the entity comprising:
    a network access entity configured to be connected to a cellular network and configured to transmit, in case of an emergency, a vehicle position via the cellular network to a service entity configured to collect the vehicle positions for a plurality of vehicles;
    an antenna signal interface configured to receive satellite-based measurement data;
    at least one position determining unit configured to determine positioning data of the vehicle based on the satellite-based measurement data, wherein the at least one position determining unit, is configured to guarantee a predefined integrity level describing a predefined risk classification of a functional safety provided by the positioning data as determined by the at least one position determining unit, wherein the at least one position determining unit is configured to provide the determined positioning data to an application entity in the vehicle requiring the predefined integrity level for the positioning data;
    the at least one position determining unit has a first measurement entity configured to guarantee the predefined integrity level, to determine raw satellite position data from the received satellite based measurement data, and to transmit the determined raw satellite position data from the first measurement entity to a first positioning entity configured to determine a first position of the vehicle meeting the predefined integrity level based on the raw satellite position data;
    the first positioning entity is configured to receive the raw satellite position data from the first measurement entity and is configured to determine a first position of the vehicle based on the raw satellite position data, the first position meeting, the predefined integrity level;
    a bidirectional communication channel between the first measurement entity and the first positioning entity, the bidirectional communication channel is configured with an end-to-end protection between two ends of the bidirectional communication channel with no modification of information transmitted in the bidirectional communication channel between the two ends of the bidirectional communication channel;
    each end of the bidirectional communication channel is configured to detect invalid, missing, or delayed information transmitted between the two ends of the bidirectional communication channel;
    the first positioning entity is configured to provide the determined first position as positioning data to the application entity in a further bidirectional communication channel between the first positioning entity and the application entity, the further bidirectional communication channel is configured with an end-to-end protection between two ends of the further bidirectional communication channel with no processing or modification of information transmitted in the further bidirectional communication channel between the two ends; and
    each end of the further bidirectional communication channel is configured to detect invalid, missing, or delayed information transmitted between the two ends of the further bidirectional communication channel.

2. The telematics control entity according to claim 1, wherein the predefined integrity level is an automotive safety integrity level ASIL defined by ISO 26262.

3. The telematics control entity according to claim 2, wherein the position determining unit is configured as Safety Element out of Context, SEooC.

4. The telematics control entity according to claim 1, wherein the network access entity further comprises a second positioning entity configured to receive the satellite-based measurement data and configured to determine a second position of the vehicle, the second positioning entity does not meet any predefined integrity level describing a predefined risk classification of a functional safety provided by the second position as determined by the second positioning entity, and the network access entity is configured to transmit the second position as vehicle position to the service entity.

5. The telematics control entity according to claim 4, further comprising a splitting unit configured to split the received satellite-based measurement data and to provide the satellite-based measurement data to the first measurement entity and to the second positioning entity.

6. The telematics control entity according to claim 1, wherein:
    the first positioning entity is configured to provide the first position meeting the predefined integrity level to the network access entity; and
    the network access entity is configured to transmit the first position as vehicle position to the service entity.

7. The telematics control entity according to claim 1, wherein the first positioning entity is configured to receive position adjustment data from the cellular network or via satellite and is configured to use the position adjustment data to determine the first position with a higher accuracy than the vehicle position determined by the network access entity.

8. The telematics control entity according to claim 1, further comprising a bidirectional communication channel between the first measurement entity and the first positioning entity provided outside the telematics control entity, the bidirectional communication channel is configured with an end-to-end protection between the two ends of the bidirectional communication channel with no processing or modification of information transmitted in the bidirectional communication channel between the two ends of the communication channel, wherein each end of the bidirectional communication channel is configured to detect invalid, missing or delayed information transmitted between the two ends of the communication channel, wherein the first measurement entity is configured to provide the raw satellite positioning data as positioning data to the first positioning entity.

9. The telematics control entity according to claim 8, further comprising a second positioning determining entity configured to receive the raw satellite positioning data from the first measurement entity and to determine a second position of the vehicle, wherein the second position determining entity does not meet any predefined integrity level describing a predefined risk classification of a functional safety provided by the second position as determined by the second positioning entity, the second positioning entity being configured to transmit the second position to the network access entity, wherein the network access entity is configured to transmit the second position as vehicle position to the service entity.

10. The telematics control entity according to claim 1, wherein the receiver of satellite-based data is an element which is not developed in a context of a particular vehicle or system.

11. The telematics control entity according to claim 1, wherein the at least one position determining unit is configured to detect when an error occurring in the received raw satellite position data is occurring without a need of an input from outside the at least one position determining unit.

12. A method for operating a telematics control entity configured to determine position data of a vehicle, wherein the telematics control entity comprises a first measurement entity, and a network access entity connected to a cellular network and transmitting, in case of an emergency, a vehicle position via the cellular network to a service entity collecting the vehicle positions for a plurality of vehicles in case of emergencies, the method comprising the steps of:
 receiving, by an antenna signal interface of the telematics control entity, satellite-based measurement data;
 determining, by at least one position determining unit of the telematics control entity, positioning data of the vehicle based on the satellite-based measurement data;
 guaranteeing, by the first measurement entity, a predefined integrity level describing a predefined risk classification of a functional safety provided by the positioning data as determined by the at least one position determining unit;
 determining, by the first measurement entity, raw satellite position data from the received satellite-based measurement data;
 transmitting the determined raw satellite position data from the first measurement entity to a first positioning entity configured to determine a first position of the vehicle meeting the predefined integrity level based on the determined raw satellite position data;
 determining, by the first positioning entity, a first position of the vehicle based on the raw satellite data received from the first measurement entity, the first position meeting the predefined integrity level;
 detecting, by a bidirectional communication channel between the first measurement entity and the first positioning entity, invalid, missing or delayed information transmitted between each end of the bidirectional communication channel, the bidirectional communication channel is configured with an end-to-end protection between two ends of the bidirectional communication channel with no modification of information transmitted in the bidirectional communication channel between the two ends of the bidirectional communication channel, each end of the bidirectional communication channel is configured to detect invalid, missing or delayed information transmitted between the two ends of the bidirectional communication channel, the first positioning entity is configured to provide the determined first position as positioning data to the application entity in a further bidirectional communication channel between the first positioning entity and the application entity, the further bidirectional communication channel is configured with an end-to-end protection between two ends of the further bidirectional communication channel with no processing or modification of information transmitted in the further bidirectional communication channel between the two ends, and each end of the further bidirectional communication channel is configured to detect invalid, missing or delayed information transmitted between the two ends of the further bidirectional communication channel; and
 providing, by the at least one position determining unit, the determined positioning data to an application entity in the vehicle requiring the predefined integrity level for the received positioning data.

13. The method as claimed in claim 12, wherein the telematics control entity further comprises a second positioning, the method further comprising the steps of:
 receiving, at the second positioning entity, satellite-based measurement data;
 determining a second position of the vehicle, the second positioning entity does not meet any predefined integrity level describing a predefined risk classification of a functional safety provided by the second position as determined by the second positioning entity; and
 transmitting, by the network access entity, the second position as vehicle position to the service entity.

14. The method as claimed in claim 12, further comprising the step of receiving, by the first positioning entity, position adjustment data from the cellular network or via satellite, the first positioning entity uses the position adjustment data to determine the first position of the vehicle with a higher accuracy than the vehicle position determined by the network access entity.

15. A computer program embodied on a computer readable storage medium for processing program code to be executed by a telematics control entity, wherein execution of the program code causes the telematics control entity to carry out a method comprising the steps of:
 receiving, by an antenna signal interface of the telematics control entity, satellite-based measurement data;
 determining, by at least one position determining unit of the telematics control entity, positioning data of the vehicle based on the satellite-based measurement data;
 guaranteeing, by the first measurement entity, a predefined integrity level describing a predefined risk classification of a functional safety provided by the positioning data as determined by the at least one position determining unit;
 determining, by the first measurement entity, raw satellite position data from the received satellite-based measurement data;
 transmitting the determined raw satellite position data from the first measurement entity to a first positioning entity configured to determine a first position of the vehicle meeting the predefined integrity level based on the determined raw satellite position data;
 determining, by the first positioning entity, a first position of the vehicle based on the raw satellite data received from the first measurement entity, the first position meeting the predefined integrity level;
 detecting, by a bidirectional communication channel between the first measurement entity and the first positioning entity, invalid, missing or delayed information transmitted between each end of the bidirectional communication channel, the bidirectional communication channel is configured with an end-to-end protection between two ends of the bidirectional communication channel with no modification of information transmitted in the bidirectional communication channel between the two ends of the bidirectional communication channel, each end of the bidirectional communication channel is configured to detect invalid, missing or delayed information transmitted between the two ends of the bidirectional communication channel, the first positioning entity is configured to provide the determined first position as positioning data to the application entity in a further bidirectional communication channel between the first positioning entity and the application entity, the further bidirectional communication channel is configured with an end-to-end protection between two ends of the further bidirectional communication channel with no processing or modification of information transmitted in the further bidirectional communication channel between the two ends, and each end of the further bidirectional communication channel is configured to detect invalid, missing or delayed information transmitted between the two ends of the further bidirectional communication channel; and providing, by the at least one position determining unit, the determined positioning data to an application entity in the vehicle requiring the predefined integrity level for the received positioning data.

* * * * *